March 13, 1951 E. J. LESNIAK 2,545,236
UTILITY MIXER ATTACHMENT FOR TRACTORS
Filed Nov. 19, 1947 4 Sheets-Sheet 1
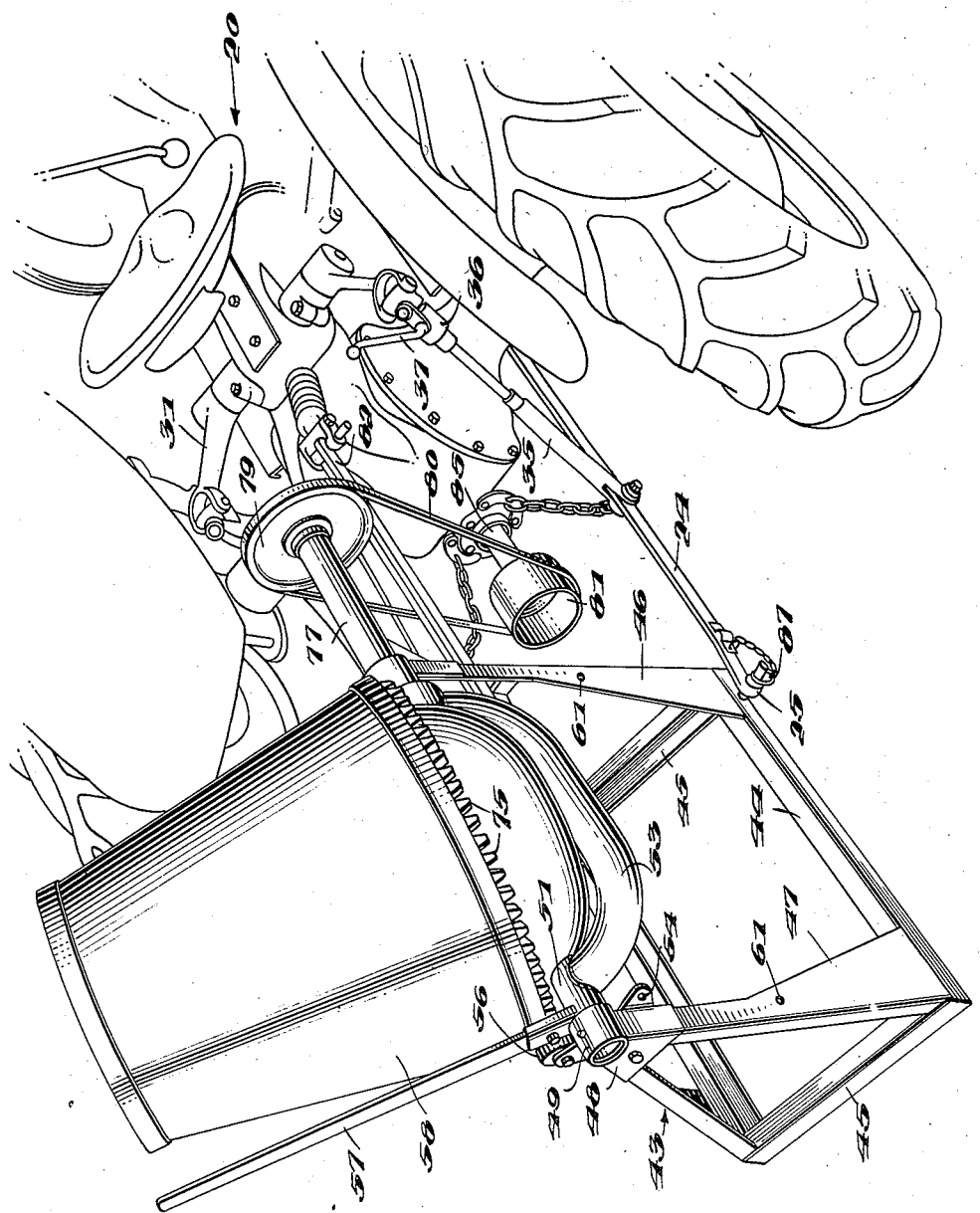
Inventor
EDWARD J. LESNIAK,
By George Rex Frye.
Attorney

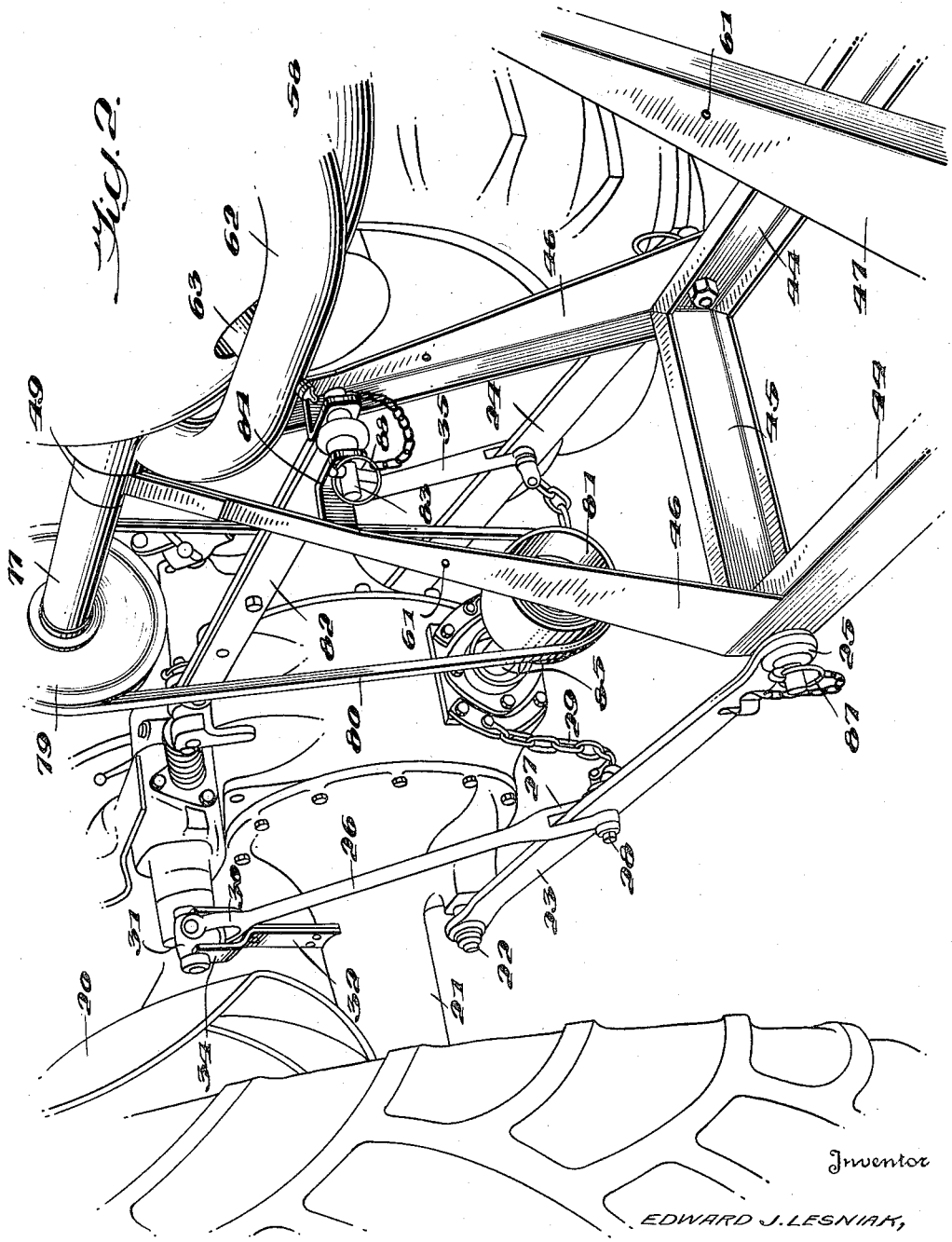

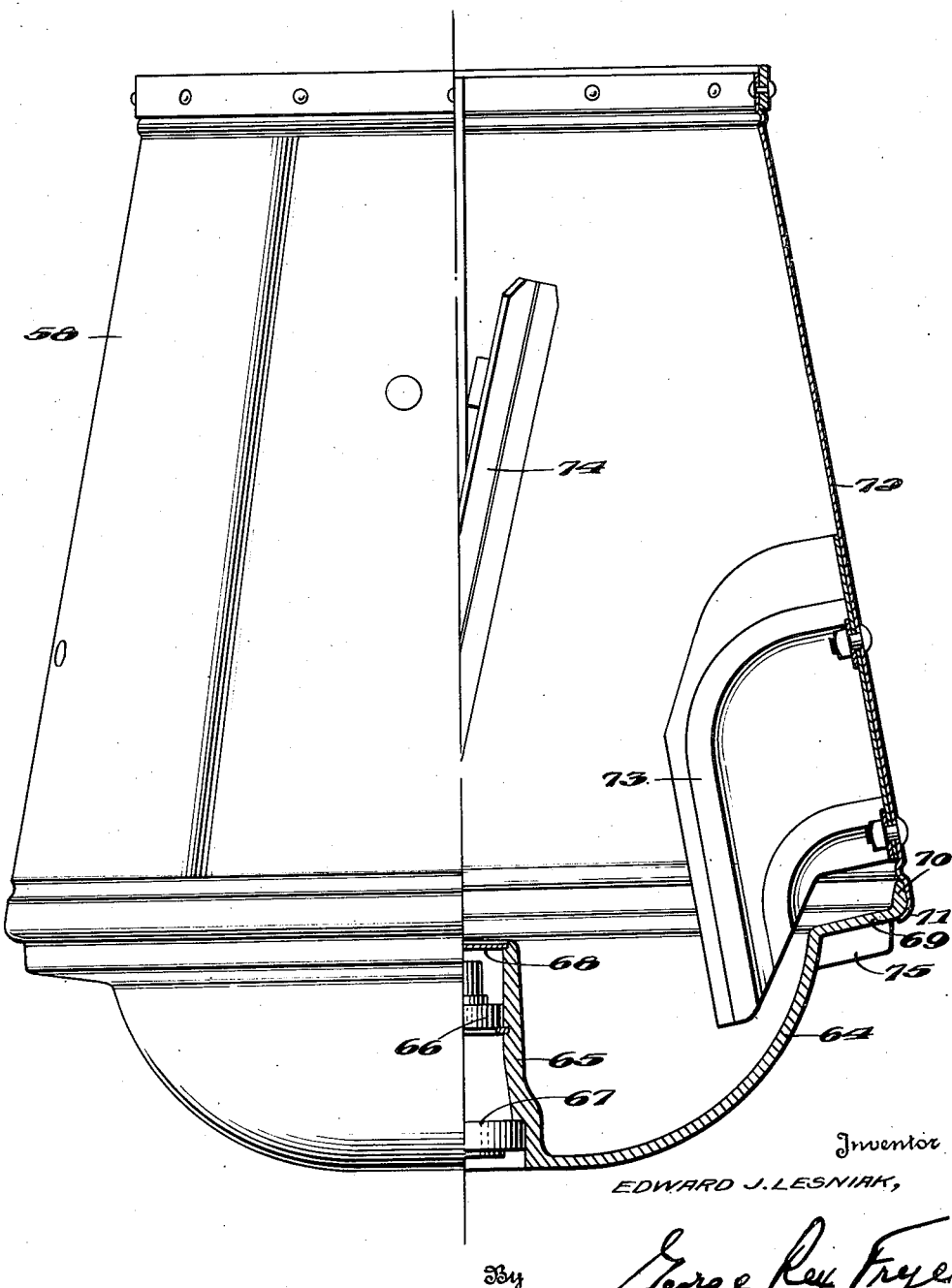

March 13, 1951 E. J. LESNIAK 2,545,236
UTILITY MIXER ATTACHMENT FOR TRACTORS
Filed Nov. 19, 1947 4 Sheets-Sheet 4
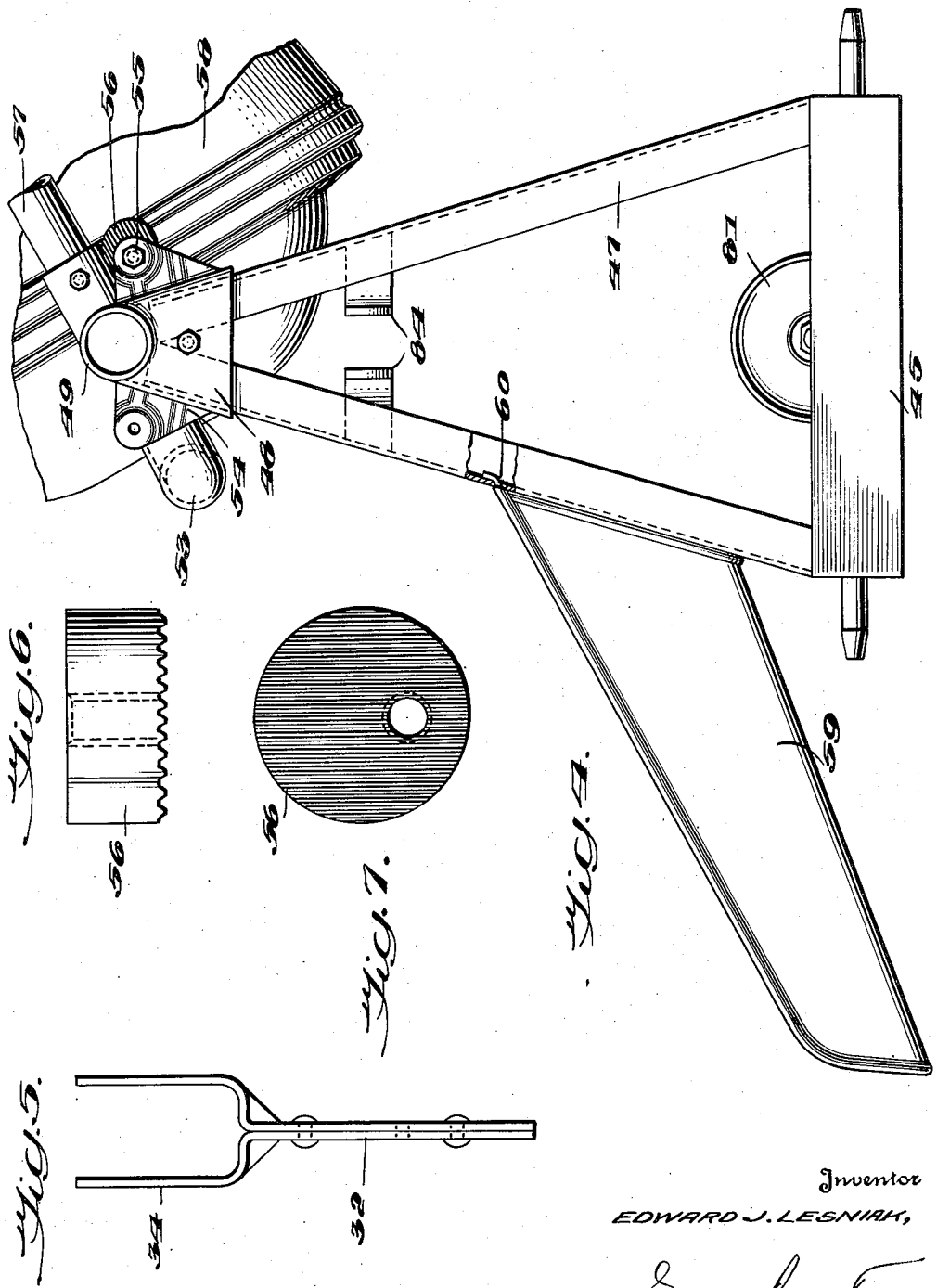
Inventor
EDWARD J. LESNIAK,
By George Rex Frye.
Attorney

Patented Mar. 13, 1951

2,545,236

UNITED STATES PATENT OFFICE 2,545,236

UTILITY MIXER ATTACHMENT FOR TRACTORS

Edward J. Lesniak, Detroit, Mich.

Application November 19, 1947, Serial No. 786,925

5 Claims. (Cl. 259—177)

This invention relates to improvements in portable utility mixers, and more particularly to a utility mixer attachment for farm tractors, the primary object of the invention being to provide a practical, efficient, and low cost arrangement of this character which can be easily attached to and detached from the tractor, and by means of which tractor owners can efficiently and conveniently mix feeds, grains, concrete, and the like while the tractor is standing or while the tractor is being driven to a point or points of discharge of the mix.

Another important object of the invention is to provide an easily detachable tractor-borne utility mixer, by means of which concrete can be efficiently mixed for use, and such operations as the concreting of fence post holes and the like can be easily and rapidly carried out, by driving the tractor to the sites of the holes to be concreted and discharging the concrete mix directly into the holes.

Another important object of the invention is to provide a utility mixer attachment of the above indicated character which is characterized by simple and rugged construction and which utilizes principally accessories already present on or usually associated with such farm tractors as the Ford and others for the mounting thereof on the tractor and for the driving thereof from the power take-off of the tractor.

Other important objects and advantageous features of the invention will be apparent from the following description and the drawings appended thereto, wherein, for purposes of illustration, a presently preferred embodiment of the invention is set forth.

In the drawings:

Fig. 1 is a perspective view of my improved utility mixer mounted upon a tractor, taken from behind and to the right of the tractor.

Fig. 2 is an enlarged perspective view, showing the supports connecting the mixer and tractor, and taken from the left of the tractor adjacent its left wheel.

Fig. 3 is a detail view showing the mixer bowl, the left half being shown in elevation and the right half being shown broken away and in section to reveal the interior of the bowl.

Fig. 4 is a side elevation of the mixer frame detached from the tractor, and supporting a delivery chute.

Fig. 5 is an end elevation of the support adapted for insertion between the left hydraulic arm of the tractor and the axle housing.

Fig. 6 is a side view, and Fig. 7 is a rear view of the eccentric cylindrical stop member for limiting the degree of tilt of the mixer bowl during loading or its rotation for mixing ingredients.

Referring in detail to the drawings, the Ford or similar type tractor 20 includes the rear axle housing 21 to the underside of which are horizontally pivoted at 22 the forward ends of left and right hand draw bar links 23 and 24, respectively, having journals 25, 25 on the rearward ends. A diagonal link 26 has a clevis 27 on its depressed rearward end pivoted to an intermediate part of the draw bar link 23 on a pin 28 tethered on a retaining chain 29, and the elevated forward end of the diagonal link 26 has a clevis 30 pivoted to the left hand hydraulic arm 31 of the tractor. A support 32, comprising two plate-like elements riveted together to form a body portion, curved at its lower end to seat upon the axle housing under the arm 31 and spaced laterally to form bracket arms 34 on its upper ends, the arms 34 thereof engaging with hydraulic arm 31 on opposite sides of the clevis in supporting relation to the clevis 30, whereby the draw bar link 23 is maintained in substantially horizontal position (Fig. 2).

The diagonal link 35 similarly supporting the right hand draw bar link 24 includes an extending and retracting mechanism 36 including a crank handle 37 (Fig. 1).

The mixer per se comprises the frame 43 which includes an elongated rectangular open base composed of connected flanged side members and end members 44, 45, respectively, and front and rear pairs of upwardly tapering angle iron members 46, 46 and 47, 47, respectively, whose lower ends are fixed at the corners of the base, and whose upper ends are surmounted by substantially triangular cap and bearing supporting elements 48, 48 which include rear and front journals or trunnion bearings 49, which turnably support the rearward and forward trunnion portions 51 of the mixing bowl supporting shaft 53.

The rear trunnion bearing element 49 includes apertured side ears 54, 54 taking a bolt 55 (Fig. 4) which traverses and mounts at either side, as desired, the eccentric cylindrical stop member 56 which is arranged to be engaged by the lower part of the mixer bowl tilting handle 57 which rises from the rear trunnion portion 51 of the shaft 53, so that the mixer bowl 58 is properly supported at an angle to the perpendicular during its rotation in a mixing operation and while the tractor is standing or is being driven to a desired site. With the stop member 56 located at the left hand side, the tilting of the bowl for discharge is toward the right (Fig. 1), while location of the stop on the right hand side provides for discharge tilting of the bowl toward the left (Fig. 4). A quickly transferable declining and downwardly tapering discharge chute 59 includes hooks 60 on the upper ends of its sides which are engageable in holes 61 provided in the frame uprights at either side of the frame, so that the chute can be easily transferred to serve at either side of the frame to receive and guide the mix as it is discharged by tilting of the bowl 58.

The mixer bowl shaft 53, as shown in Figures 1 and 2, includes the downwardly bowed intermediate part 62 from whose middle rises the stubshaft 63 upon which the bowl 58 is axially journalled. The rear and front trunnion portions 51 of the shaft 53 may be mounted in the frame journals or trunnion bearings 49 without the intervention of ball or roller bearings.

The mixer bowl 58 comprises, as shown in Figures 1 and 3, comprises a heavy concave-convex base 64 which has an axial upwardly tapering tubular bearing housing 65 into whose bore is inserted the stubshaft 63, with vertically spaced roller bearings 66 and 67, respectively, interposed between the stubshaft and the housing, whereby the base 64 is freely rotatable on the stubshaft 63. The top of the housing 64 has a sealing closure 68 (Fig. 3).

The perimeter of the bowl base 64 has a flange 69 including an upturned rim 70, around which is pressed the conformably shaped lower edge 71 of the upwardly tapering relatively light gauge metal casing 72, whereby the casing is assembled to the base 64. The casing 72 has in its lower part at regular intervals, relatively short downwardly projecting agitator baffles 73, and above at regular intervals relatively long straight parallel sided baffles 74 mounted at an angle to the axis of the casing and slanting with the tapered side wall of the casing, substantially as shown in Fig. 3, whereby the contents of the bowl are thoroughly mixed and agitated as the bowl 58 is rotated.

For the rotation of the bowl 58 on its axis the bowl base is provided with a ring of gear teeth 75 on the underside of the peripheral flange 69. With the teeth 75 is meshed a bevel pinion (not shown) on the rear end of the drive shaft 77 which is journalled through the front trunnion portion of the bowl supporting shaft 53, on a suitable roller bearing. The forward end of the drive shaft 77 is provided with a grooved pulley 79 accommodating the drive belt 80 which is trained over the tractor power take-off pulley 81.

The lateral flights of the belt 80 are disposed on opposite sides of the tractor upper draw bar 82 which is pivoted by its front end to the tractor and has its rear end journalled horizontally on a pin 83 (Fig. 2), which in turn is journalled in rearwardly turned ears 84, 84 provided on the forward mixer frame uprights 46, 46 beneath the mixer bowl shaft 53, so that in the installed position of the mixer the upper draw bar 82 is in a substantially horizontal position, and the mixer frame is supported with its lower portion in generally parallel relation to the ground.

In order to properly position the tractor power take-off pulley 81 in vertical alignment beneath the mixer bowl drive shaft pulley 79, the usual cap (not shown) is unscrewed from the take-off shaft 85 and the pulley 81 is slid rearwardly along the shaft 85 until the bolt holes therein line up with holes provided in the shaft 85 and the pulley 81 is then bolted in place.

Before installing the mixer on the tractor 20, the tractor hydraulic control lever is preferably moved downwardly to the end of its stroke and a suitable clip inserted to clamp it in place, so that in the event of the control lever being truantly lifted while the mixer is carried by the tractor, damage to the hydraulic pump of the tractor or to the mixer will be prevented.

To install the mixer upon the tractor, draw bar link 23 is lifted upwardly high enough to enable placing under the pivot of the left hand hydraulic arm 31 the bracket arms 34 of support 32. The draw bar links are then lowered until the lower end of support 32 rests upon the tractor rear axle housing 21. The tractor power take-off pulley 81 is then positioned on take-off shaft 85 as described above, whereupon the drive belt 80 is placed around the upper draw bar 82 and beneath the take-off pulley 81. The front of the mixer frame is then raised and the lower draw bar links 23 and 24 are pivotally connected to the sides of the front end of the frame base (Fig. 2), and maintained against accidental dislocation therefrom by means of the chained cotter pins and retaining rings 87. The rear end of the upper draw bar 82 is then pivoted to the upper forward part of the mixer frame by engaging the pivot pin 83 in the apertured ears 84, 84, of the frame and securing the pin in place by a chained ring 88 (Fig. 2).

The drive belt 80 is then placed in the groove of the drive shaft pulley 79 and the crank handle 37 on the right hand diagonal link 35 is turned to extend the link 35, to thereby tension the belt 89 on the pulleys 79 and 81 sufficiently to assure turning of the mixing bowl when the tractor power take-off pulley 81 is rotated.

Ingredients to be mixed may be introduced into the mixing bowl through its open top, either while it is rotating or stationary. In the case of concrete mixing, a hose or the like may deliver water to the bowl simultaneously with the delivery of cement and gravel thereto, or separately as desired. Thorough mixing of ingredients is insured by rotation of the bowl for suitable time periods, which can be during transportation of the bowl from place to place or while the tractor is located in a desired position. After thorough mixing, the contents of the bowl may be discharged by tilting the bowl away from the then position of stop member 56 by grasping the tilting handle 57. A discharge chute, as 59, is preferably used to guide the mix as it is discharged but obviously the bowl contents may be discharged without using the chute if the tractor is positioned where the bowl will deliver directly to a desired receptacle, etc.

It is believed to be apparent from the above description that my improved utility mixer is light, and simple in its construction and use. It can be quickly mounted upon a conventional farm tractor and transported therewith wherever desired. It has no wheels and so will not interfere with the tractor movements in any direction. Many mixes may be directly compounded in the mixing bowl, including those of all dry material, such as stock feeds, fertilizers, etc., as well as combined liquid and dry ingredients, such as concrete.

While the illustrated embodiment is believed to adequately fulfill the objects and advantages hereinabove stated, it is to be understood that modification and variation may readily be made, within the spirit and scope of the subjoined claims.

I claim:

1. The combination with a tractor having a rear axle assembly and a rear power take-off, of a utility mixer comprising a frame, a rotatable and laterally tiltable vertical axis mixer bowl mounted on said frame, means for tilting said bowl between a position of rest at one side of its axis of tilt to an inverted discharging position at the opposite side of its axis of tilt, drive means connected between the tractor take-off and said bowl for rotating the bowl on its axis, and quick detachable means mounting said frame upon said rear axle assembly, said quick detachable means comprising one upper and two lower drawbar links secured to and between upper and lower levels of said rear axle assembly and said frame respectively, and a pair of diagonal link supporting means respectively connected to and between an upper level of said rear axle assembly and intermediate portions of said lower level drawbar links.

2. The combination with a tractor having a rear axle assembly and a rear power take-off, of a utility mixer comprising a frame, a rotatable and laterally tiltable vertical axis mixer bowl mounted on said frame, means for tilting said bowl between a position of rest at one end of its axis of tilt to an inverted discharging position at the opposite side of its axis of tilt, drive means connected between the tractor take-off and said bowl for rotating the bowl on its axis, and quick detachable means mounting said frame upon said rear axle assembly, said quick detachable means comprising one upper and two lower level drawbar link means pivotally secured to and between upper and lower levels of said rear axle assembly and said frame respectively, and a pair of diagonal link supporting means respectively connected to and between an upper level of said rear axle assembly and intermediate portions of said lower level drawbar link means, at least one of said diagonal link supporting means being adjustable lengthwise to determine the angular relation of said frame with respect to said rear axle assembly.

3. In combination, a tractor having a rear axle housing surmounted by left and right hand hydraulic arms, an upper level drawbar link extending rearwardly from a point between said arms, and laterally spaced lower level drawbar links extending rearwardly from said axle housing, all of said links being horizontally pivoted on said tractor, and a power take-off including a pulley positioned rearwardly of said axle housing, and a utility mixer attachment to said tractor comprising a frame comprising a horizontal base portion to the forward end of which the rear ends of said lower level links are horizontal pivoted, rear and front standards rising from the rear and front of said base portion with the rear end of said upper level link horizontally pivoted to intermediate portions of said front standards, journals on the upper ends of said standards, a forwardly and rearwardly extending mixer bowl shaft journaled in said journals, a vertical stub-shaft rising from said shaft between said journals, a vertical axis mixer bowl having an axial journal housing rotatably and supportably receiving said stubshaft, a ring gear encircling the lower part of said mixer bowl, said mixer bowl shaft having a tubular forward part, a drive shaft axially journaled in said tubular part, a pinion on the rear end of said drive shaft meshed with said ring gear, a drive pulley at the forward end of said drive shaft, a drive belt trained over said drive pulley and over the pulley of the tractor take-off, and diagonal links extending between said tractor and intermediate portions of said lower level drawbar links for holding said mixer attachment in the desired position above the ground.

4. The combination as recited in claim 1 with a removable support resting upon a fixed portion of said rear axle assembly and arranged to maintain one of said diagonal link supporting means in selected elevated position to thereby prevent accidental lowering of said utility mixer.

5. The combination with a tractor having a rear axle assembly and a rear power take-off, of a utility mixer comprising a frame, a rotatable and tiltable vertical axis mixer bowl mounted on said frame, means for tilting said bowl between a position of rest at one side of its axis of tilt to an inverted discharging position at the opposite side of its axis of tilt, drive means connected between the tractor take-off and said bowl for rotating the bowl on its axis, and quick detachable means mounting said frame upon said rear axle assembly, said quick detachable means comprising upper and lower drawbar links secured to and between upper and lower levels of said rear axle assembly and said frame respectively, and diagonal link supporting means respectively connected to and between an upper level of said rear axle assembly and intermediate portions of said lower level drawbar links.

EDWARD J. LESNIAK.

REFERENCES CITED

The following references are of record in the file of this patent:

UNITED STATES PATENTS

| Number | Name | Date |
| --- | --- | --- |
| 1,322,575 | Jaeger | Nov. 25, 1919 |
| 1,453,323 | Palmeter | May 1, 1923 |
| 2,397,324 | Muckley | Mar. 26, 1946 |
| 2,397,851 | Gaertner | Apr. 2, 1946 |